United States Patent [19]

Nobile

[11] Patent Number: 5,791,401
[45] Date of Patent: Aug. 11, 1998

[54] HEAT RECOVERY DEVICE FOR SHOWERS

[76] Inventor: John R. Nobile, 65 Forest Ave., Fairfield, Conn. 06430

[21] Appl. No.: 645,251

[22] Filed: May 13, 1996

[51] Int. Cl.⁶ .............. F24D 17/00; F24H 1/16; A47K 3/22
[52] U.S. Cl. .............. 165/47; 165/66; 165/179; 165/164; 137/247.41; 137/247.51; 4/598
[58] Field of Search .............. 165/47, 66, 179, 165/164; 137/247.41, 247.49, 247.51, 247.11; 4/598

[56] References Cited

U.S. PATENT DOCUMENTS

| | | | |
|---|---|---|---|
| 438,025 | 10/1890 | Serve | 165/179 |
| 545,307 | 8/1895 | Pool | 137/247.51 |
| 809,971 | 1/1906 | McCartney | 137/247.41 |
| 2,615,686 | 10/1952 | Davidson et al. | 165/117 |
| 2,650,800 | 9/1953 | Taylor | 165/117 |
| 4,256,170 | 3/1981 | Crump | 165/154 |
| 4,304,292 | 12/1981 | Cardone et al. | 165/47 |
| 4,372,372 | 2/1983 | Hunter | 165/47 |
| 4,398,308 | 8/1983 | Berg | 165/66 |
| 4,542,546 | 9/1985 | Desgagnes | 165/66 |
| 4,619,311 | 10/1986 | Vasile et al. | 165/47 |
| 5,143,149 | 9/1992 | Kronberg | 165/66 |

FOREIGN PATENT DOCUMENTS

| | | | |
|---|---|---|---|
| 3932871 | 2/1990 | Germany | 165/47 |
| 0189236 | 10/1984 | Japan | 165/47 |
| 577482 | 5/1946 | United Kingdom | 137/247.51 |
| 621143 | 4/1949 | United Kingdom | 137/247.51 |
| 2165932 | 4/1986 | United Kingdom | 165/47 |

*Primary Examiner*—John K. Ford
*Attorney, Agent, or Firm*—Martin D. Wittstein

[57] ABSTRACT

A heat recovery device is disclosed which is adapted for use in the drain conduit of standard shower installations having a hot water line, a cold water line, means for mixing water from both lines to deliver water at a suitable temperature to a shower head, and a drain conduit for disposing of waste water passing through the shower installation, the heat recovery device transferring heat from the waste water to cold water flowing to the cold water line. The heat recovery device has a first conduit connected into the drain conduit of the shower installation, and a second conduit connected into the cold water line leading into the shower installation and either wrapped around or inserted within the first conduit so that the second conduit is in operative heat transfer relationship with warm waste water passing through the first conduit, so that the incoming cold water is preheated by heat recovered from the waste water and transferred to the cold water.

4 Claims, 4 Drawing Sheets

HEAT RECOVERY DEVICE FOR SHOWERS

BACKGROUND OF THE INVENTION

This invention relates generally to the field of heat exchangers, and more particularly to a novel heat exchanger for use in a shower environment which recaptures heat from waste water passing through the shower drain and distributes that heat into cold water entering the shower to raise the temperature of the cold water.

It is well known that showering for the purpose of maintaining cleanliness is almost universally practiced in civilized society. There is hardly any form of habitation, whether personal residences, commercial habitations, or other miscellaneous bathing facilities, that does not provide the necessary equipment for showering. Showering has become, in modern society, so commonplace that many individuals shower at least once a day, others several times per week. There are those who prefer showering to bathing in a tub for several reasons, principal among them that showering is less strenuous, cleans more effectively due to the constant rinsing action rather than sitting in unclean water, requires less hot water (if the shower is not of excessive length) and generally can be more aesthetically pleasing and restful.

Despite the fact that showers of reasonable length and temperature may consume less hot water than bathing in a tub, the fact remains that a substantial amount of hot water is lost down the drain, since the shower water remains in the shower installation for a very brief period of time, which generally is insufficient for the water to lose its heat. This, of course, is wasteful of energy, and represents an expense in the cost of fuel or electricity to heat the water which could be avoided if the heat lost in the waste water could be recaptured and transferred to the incoming cold water to pre-heat it to some degree. It has been estimated that approximately $50.00 dollars per year could be saved by the average homeowner with a family of four who shower daily through the installation and use of the heat recovery device of the present invention with an electric water heater. By multiplying this amount by the approximate number of shower installations in the United States alone, one can begin to appreciate the significance of the economic and environmental impact of the present invention.

Devices for efficiently and economically exchanging heat between two fluids have been well known for many year and are widely used throughout industry. None of these devices, however, can be effectively applied to the application of recovering heat from the waste water passing through the drain conduit of a shower installation because of the unique environment and requirements of such a system, such as fitting into existing standard plumbing equipment and available spaces, and not interfering with the flow of waste water or with the normal drain cleaning procedures. The heat recovery device of the present invention can be easily and quickly installed into either a new or existing shower installation, and will not interfere with the flow of waste water through the drain or complicate cleaning or unclogging procedures in the drain conduit. Further, it is capable of recovering as much as 30% of the heat energy that is consumed during a typical shower.

Thus, there is a need for a practical, inexpensive, highly efficient, maintenance free and non-problem causing device for recapturing heat from shower waste water after it has entered the shower drain and transferring that heat to incoming cold water before the cold water reaches the shower head.

BRIEF SUMMARY OF THE INVENTION

The present invention substantially if not entirely meets all of the aforementioned requirements for a heat recovery device intended for use in the environment of personal shower installations. Thus, in its broader aspects, the present invention is a heat recovery device adapted for use in the drain conduit of standard shower equipment installations having a hot water line, a cold water line, means for mixing water from both lines to deliver water at a suitable temperature to a shower head, and a drain conduit for disposing of waste water passing through the shower installation, the heat recovery device transferring heat from the waste water to cold water flowing to the cold water line. In this environment, heat recovery device of the present invention comprises a generally tubular first conduit formed of a material having a relatively high degree of heat conductivity, the first conduit having an inlet end connected to an upstream portion of the drain conduit and an outlet end connected to a downstream portion of the drain conduit so that waste water passing through the drain conduit also passes through the first conduit. A conduit means is connected into the cold water line and is thermally operatively associated with the first conduit such that cold water passes through the conduit means while passing through the cold water line, the conduit means causing the cold water passing therethrough to be exposed to heat in the first conduit from waste water passing therethrough. Thus, heat from the waste water is conducted through the first conduit to pre-heat cold water passing through the conduit means before reaching the cold water inlet.

In some of its more limited aspects, the inlet and outlet ends of the first conduit are connected to the upstream and downstream portions respectively of the drain conduit in such a manner that the first conduit between the inlet and outlet ends thereof is disposed at a lower level than the inlet and outlet ends so that the first conduit remains filled with water at all times and functions as a water trap. Preferably, the first conduit lies in a plane that is disposed at an angle to a vertical plane passing through the upstream and downstream portions of the drain conduit, and more preferably it lies in a horizontal plane.

The conduit means comprises a second conduit formed of a material having a relatively high degree of heat conductivity, and being disposed in intimate heat exchange relationship with the first conduit, and also having an inlet end connected to an upstream portion of said cold water line and an outlet end connected to a downstream portion of the cold water line so that cold water passing through the cold water line also passes through the section of the second conduit and receives heat transferred to the first conduit by the waste water passing therethrough.

In one embodiment of the invention, the second conduit has a tubular configuration having a diameter substantially smaller than the diameter of the first conduit and is coiled around the outer surface of the first conduit in a spiral manner so that the second conduit is in intimate heat exchange relationship with the first conduit.

In another embodiment, the second conduit has a generally triangular configuration having a cross section substantially smaller than the diameter of the first conduit and is coiled around the outer surface of the first conduit in a spiral manner with one side of the triangular configuration having a curvature which corresponds to a peripheral arc of the outer surface of the first conduit so that the second conduit is in intimate heat exchange relationship with the first conduit. However, regardless of the configuration of the cross section of the second conduit, it is coiled around the first conduit in an uninterrupted succession of coils extending substantially from one end of the first conduit to the other, so that the second conduit is in heat exchange relationship with the first conduit substantially from one end thereof to the other.

In one variation of a third embodiment of the invention, the conduit means comprises a second conduit formed as a jacket surrounding the first conduit in radially spaced relationship therewith, the second conduit having an inlet end connected to an upstream portion of the cold water line and an outlet end connected to a downstream portion of the cold water line so that cold water passing through the cold water line also passes through the jacket and receives heat transferred to the first conduit by the waste water. In another variation of this embodiment, the conduit means is still a second conduit but is formed of a material having a relatively high degree of heat conductivity and is disposed within the first conduit in a concentric relationship therewith such that it is fully immersed in waste water passing through the first conduit, so that cold water passing through the second conduit receives heat transferred to it the second conduit by the waste water.

A feature of the present invention is that inner surface of the first conduit is formed with a series of radially oriented consecutive ridges and depressions which extend axially along the inner surface of the first conduit thereby substantially increasing the actual heat exchange surface of the inner surface of the first conduit relative to a flat inner surface thereof.

Having briefly described the general nature of the present invention, it is a principal object thereof to provide a heat recovery device adapted for use in the drain conduit of shower equipment installations in which heat in waste water passing through the shower equipment drain conduit is recaptured and transferred to cold water entering the shower through a cold water line.

Another object of the present invention is to provide a heat recovery device as disclosed which is designed and constructed to replace the standard water trap utilized in all shower equipment installations and to function in the same manner as a water trap.

It is another object of the present invention to provide a heat recovery device as disclosed which can be easily and economically installed in either new or existing shower equipment installations and is entirely compatible with industry standard plumbing equipment utilized in such installations.

It is still another object of the present invention to provide a heat recovery device as disclosed which is situated in the shower equipment installation so as to minimize the amount of heat loss from waste water entering and passing through the device, thereby maximizing the thermal efficiency of the system.

It is another object of the present invention to provide a heat recovery device as disclosed in which effective heat transfer between a first conduit carrying warm waste water and a second conduit carrying cold water is maintained either with or without intimate heat transfer contact between the conduits, depending on the significance of other factors involved in the shower equipment installation.

These and other objects and advantages of the present invention will be more apparent from an understanding of the following detailed description of the present preferred embodiments of the invention when considered in conjunction with the accompany drawings.

DETAILED DESCRIPTION OF THE INVENTION

Figure 1:
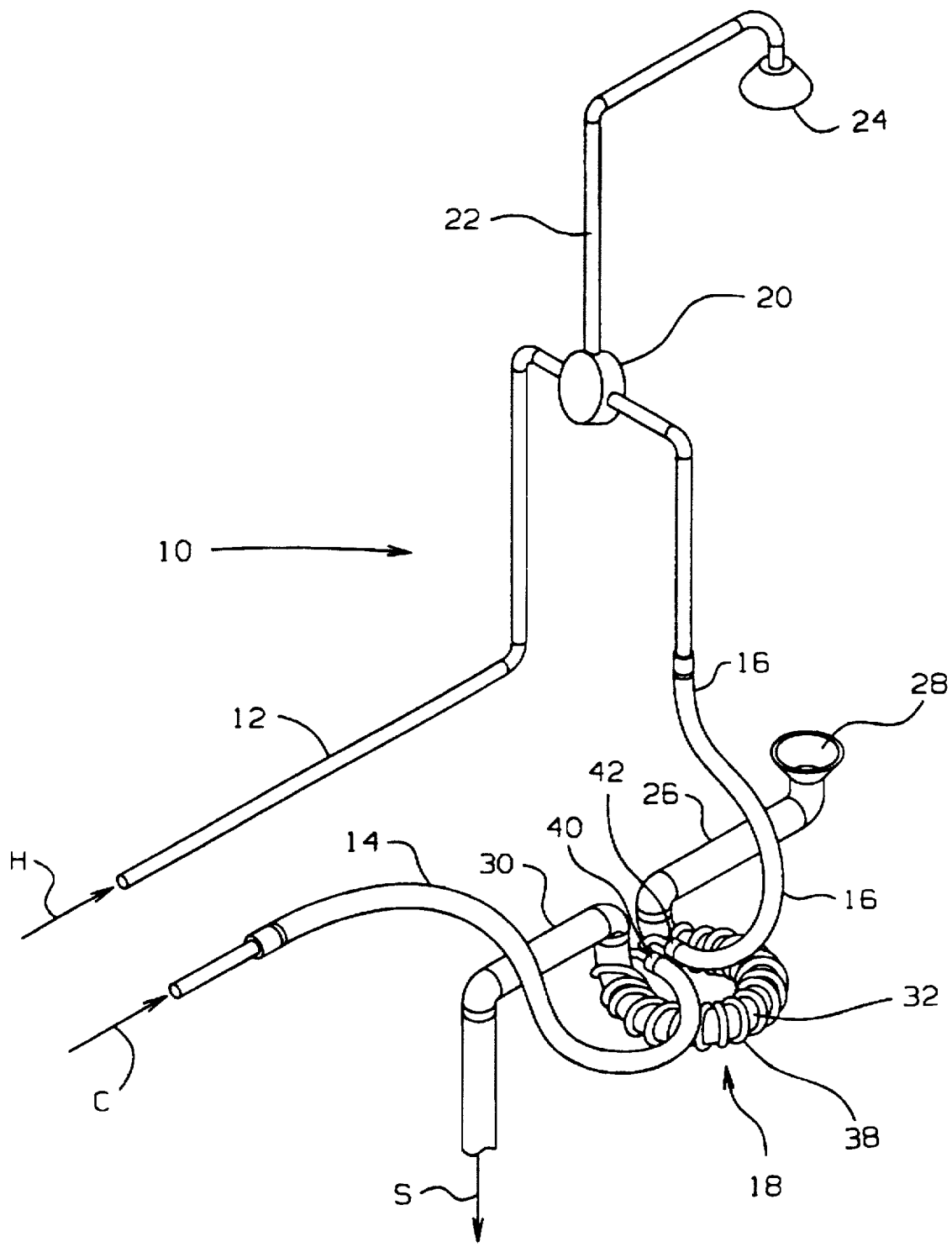
FIG. 1 is generally diagrammatic perspective view of a typical personal shower equipment installation incorporating the heat recovery device of the present invention.

Referring now to the drawings, and more particularly to FIG. 1 thereof, the general environment in which the heat exchanger device of the present invention is used is shown therein in a somewhat diagrammatic form, in which a typical shower equipment installation, indicated generally by the reference numeral 10. The shower equipment 10 typically includes a hot water line 12 which is connected to a suitable source of hot water indicated by the letter H, and a cold water line 14 which includes an upstream portion 14, the upstream end of which is connected to the service water inlet, indicated by the letter C, of the building in which the shower equipment installation is located. The cold water line also has a downstream portion 16, and the downstream end of the upstream portion 14 and the upstream end of the downstream portion 16 are connected to the heat recovery device of the present invention, indicated generally by the reference numeral 18, as fully described hereinbelow. The hot water line 12 and the downstream portion 16 of the cold water line are both connected to a mixing valve 20 which controls the flow of water therethrough and also the temperature of the water that exits the mixing valve 20 and flows into a single water inlet line 22 which terminates at a conventional shower head 24. Although not a part of the present invention, it should be understood that it is also conventional in shower equipment installations to have individual faucets for controlling the rate of flow of the hot and cold water rather than a mixing valve, the lines through each faucet joining adjacent the output of the faucets for delivery water of a desired temperature to the shower head.

The shower installation also typically includes a drain conduit having an upstream portion 26 with an inlet end 28 either disposed in the floor of a typical stall shower or incorporated into the drain outlet of a bathtub in the case of shower equipment that is an integral part of a tub assembly. In either event, drain conduit includes a downstream portion 30, and again, as with the cold water line, the downstream end of the upstream portion 26 and the upstream end of the downstream portion 30 are connected to the heat recovery device 18 of the present invention, still to be described below. The downstream portion 30 of the drain conduit is connected to the service sewer line or septic system, indicated by the letter S. It should be understood that in a properly constructed shower equipment installation, the adjacent ends of the upstream and downstream drain conduit portions 26 and 30 respectively are connected to a standard water trap which is always filled with water to seal the drain conduit to prevent offensive odors from backing up into the location of the shower equipment installation.

Figure 2:
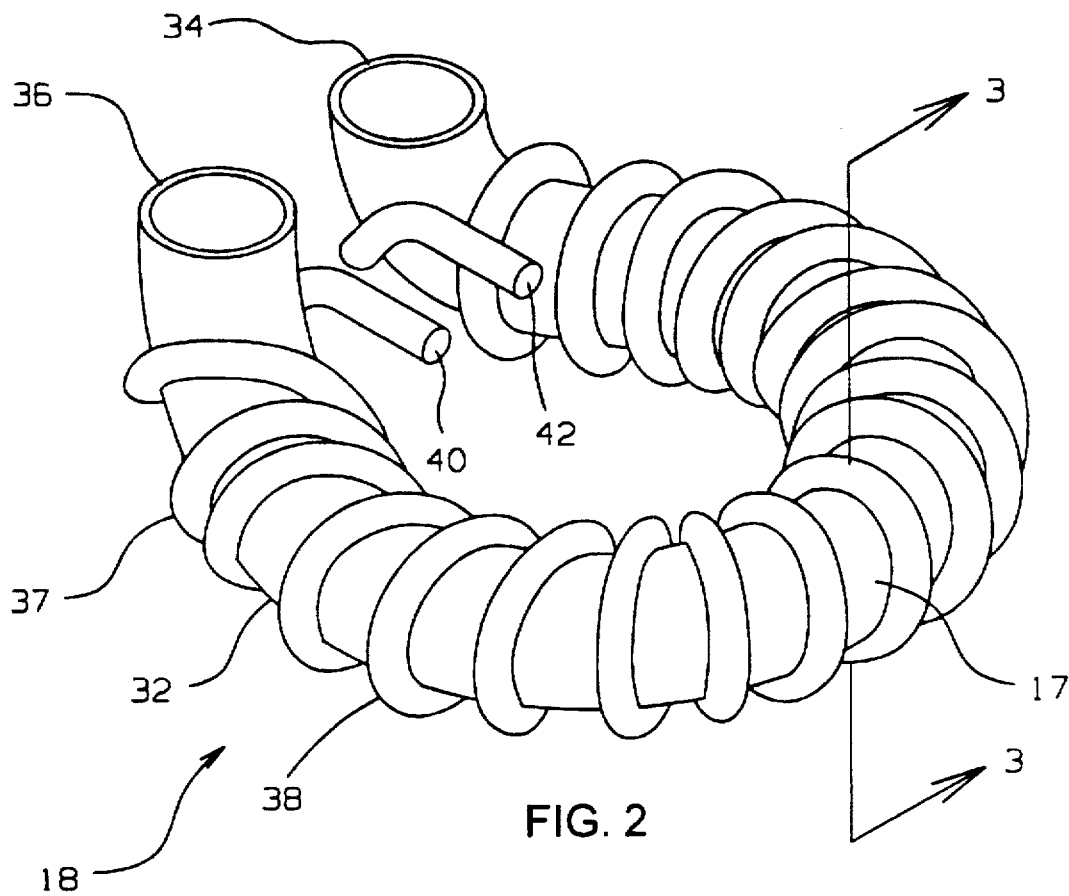
FIG. 2 is an enlarged perspective view of one embodiment of the heat recovery device utilized in the shower equipment installation shown in FIG. 1.

With reference now to FIGS. 1 and 2, it will be seen that one embodiment of the heat recovery device 18 comprises a finite length of a generally tubular first conduit 32 which is formed of a material having a relatively high degree of heat conductivity. Although the first conduit 32 is shown as being round in cross section, this is not essential and other cross section shapes are within the scope of the invention. The first conduit 32 has inlet and outlet ends 34 and 36 respectively, with the inlet end 34 being connected to the downstream end of the upstream portion 26 of the drain conduit, and the outlet end 36 being connected to the upstream end of the downstream portion 30 of the drain conduit, so that waste water passing through the drain conduit also passes through the first conduit 32.

In a typical shower equipment utilizing the heat recovery device of the present invention, it should be understood that the heat recovery device 18 is installed in the drain conduit in exactly the manner and location as the aforementioned water trap, and it performs the same function as the standard water trip. This is accomplished by having the first conduit 32 positioned at a lower level than the inlet and outlet 34 and 36, regardless of whether the conduit 32 is oriented generally in a horizontal, or other orientation. As seen in FIGS. 1 and 2, it is most preferable that the first conduit 32 lie in a generally horizontal plane, which would be perpendicular to the vertical plane passing through the upstream 26 and downstream 30 portions of the drain conduit, although the plane of the first conduit 32 could be at any angle to the vertical plane less than 90° so long as it can still fit within the space available between the under surface of the floor of the room in which the shower equipment is installed and the upper surface of the ceiling of the room therebeneath. The result is that the first conduit remains filled with water at all times, thereby preventing offensive odors from backing up as explained above.

The heat recovery device 18 further includes a conduit means connected into the cold water line between the upstream and downstream portions 14 and 16 thereof and which is thermally operatively associated with the first conduit 32 such that cold water passes through the conduit means while passing through said cold water line so as to cause cold water passing through the cold water line to be exposed to heat in the first conduit 32 from waste water passing therethrough. Thus, it will be seen that in the form of the invention shown in FIGS. 1 and 2, the conduit means is a second conduit 38 also formed of a material having a relatively high degree of heat conductivity and being disposed in intimate heat exchange relationship with the first conduit 32 by being coiled around the first conduit 32 in a spiral manner and being soldered, brazed, welded or otherwise suitably secured thereto. It will be seen that the second conduit 38 is coiled around the outer surface of the first conduit 32 in an uninterrupted succession of coils extending substantially from the inlet end 34 of the first conduit 32 to the outlet end 36 thereof so that the second conduit 38 is in continuous and uninterrupted intimate heat exchange relationship with the first conduit 32 substantially between the inlet and outlet ends 34 and 36 thereof. The second conduit 38 has an inlet end 40 connected to the upstream portion 14 of the cold water line and an outlet end 42 connected to the downstream portion 16 of the cold water line so that cold water passing through the cold water line also passes through the second conduit 38 and receives heat transferred to the first conduit 32 by the waste water therein.

It should be apparent from the foregoing that during use of the shower equipment 10, a considerable amount of heat remains in the waste water as it enters the inlet 28 and passes through the drain conduit 26, unless the user is taking a cold shower. As cold water flows through the second conduit 38, the heat in the waste water is transferred by conduction through the first conduit 32 into the second conduit 38 from which it is transferred to the cold water flowing therethrough, thereby preheating the cold water in the relative amounts mentioned above.

Figure 3:
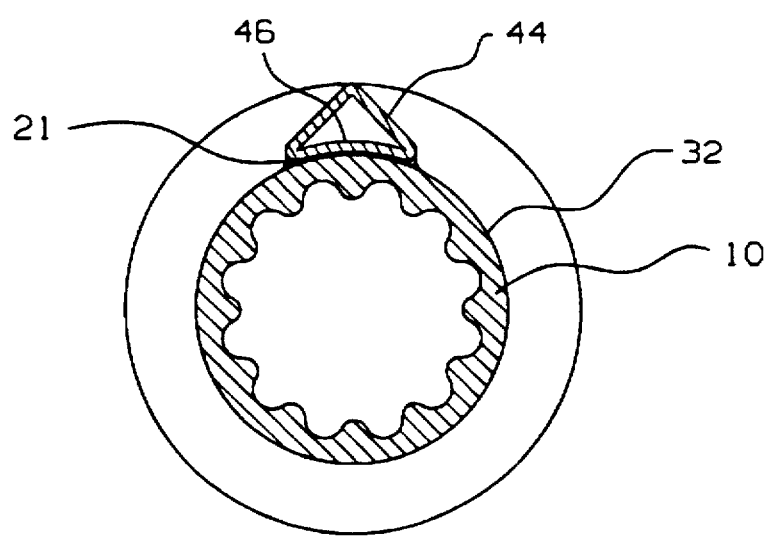
FIG. 3 is a sectional view taken on the line 3—3 of FIG. 2, which also shows a modified form of cold water conduit.

One problem with the arrangement shown in FIG. 1 is that the second conduit 38 has only a line contact with the first conduit 32 since both have a circular cross sectional configuration, thereby somewhat limiting the rate of heat transfer between the first and second conduits. FIG. 3 illustrates another embodiment of the present invention which overcomes this problem in which a second conduit 44 for the cold water is identical to arrangement and function as the second conduit 38 shown in FIG. 1 except that it is triangular in cross section, with the side 46 that is adjacent to the first conduit 32 being slightly curved to correspond with the curvature of the outer surface of the first conduit over the arc thereof covered by the side 46 of the second conduit. This allows the second conduit 44 to be secured to the first conduit 32 in any of the manners mentioned above but over a broader surface area so as to be in a more intimate heat transfer relationship than is the case with the round second conduit shown in FIG. 1, thereby greatly enhancing the rate of heat transfer from the first conduit 32 to the second conduit 44 as hot waste water is flowing through the first conduit 32.

The two embodiments of the invention illustrated in FIGS. 1 through 3 have the disadvantage that the second conduit 38 or 44, as the case may be, is wound around the first conduit 32 in a helical manner, thereby forming an irregular protrusion from the first conduit which can possibly be a source of trouble. Although this form of the heat recovery device may be economical to manufacture, the second conduits 38 or 44 are subject to possible damage in the course of installation, or even over a long period of use, due to the fact that they are not protected. The embodiment of the invention illustrated in FIGS. 4 and 5 avoid this problem by providing a second conduit 48 which is mounted within the first conduit 32 in concentric relation therewith, such that it is entirely immersed in the waste water flowing through the first conduit 32, thereby both protecting the second conduit 48 and eliminating the need for providing intimate heat transfer contact between the two conduits. The second conduit 48 as the same inlet and outlet connections 40 and 42 as the second conduit 38 or 44 of the embodiments shown in FIG. 2 and 3, except that the inlet and outlet connections of this embodiment must pass through the wall of the first conduit, as indicated at 40' and 42' of FIG. 4.

Figure 4:
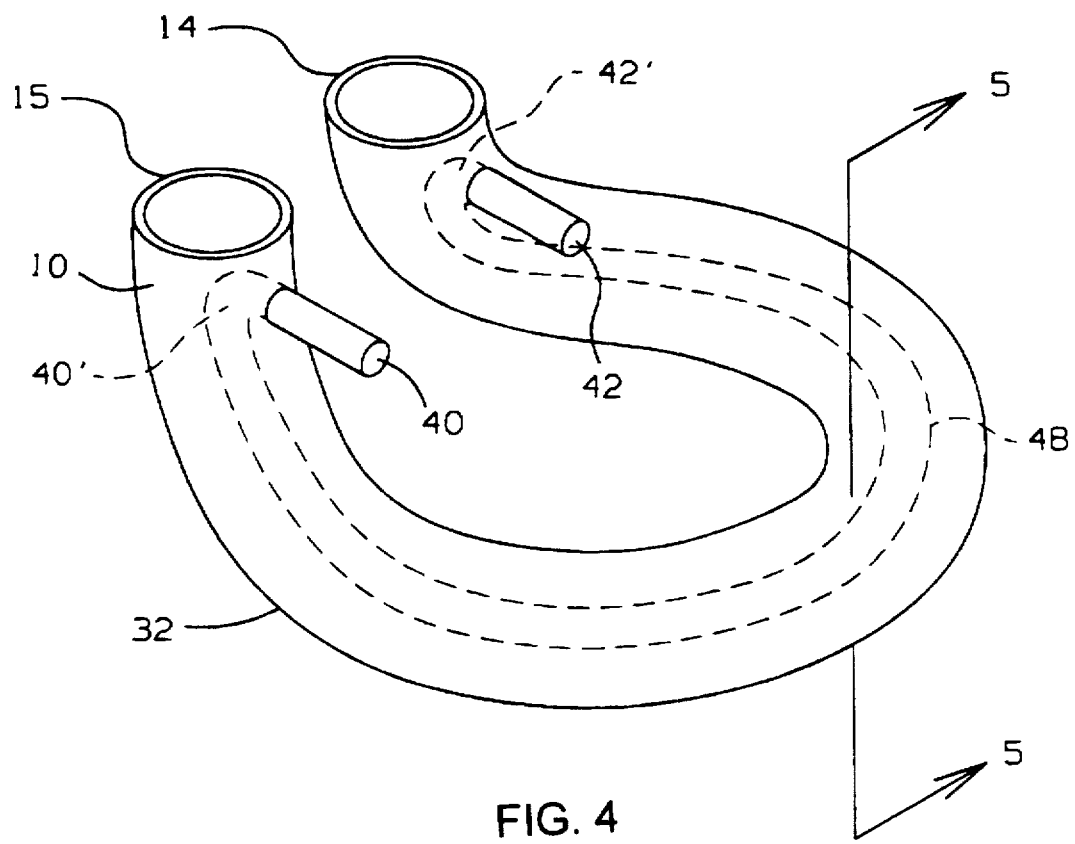
FIG. 4 is a view similar to FIG. 2 illustrating another embodiment of the heat recovery device of the present invention.
Figure 5:
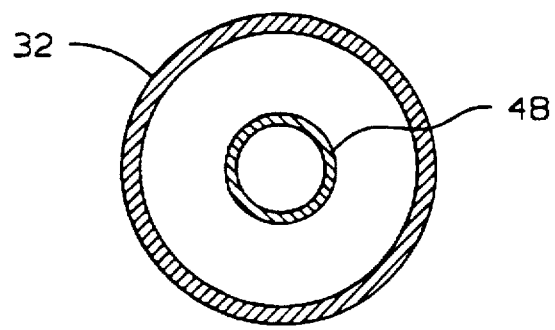
FIG. 5 is a sectional view taken on the line 5—5 of FIG. 4.
Figure 6:
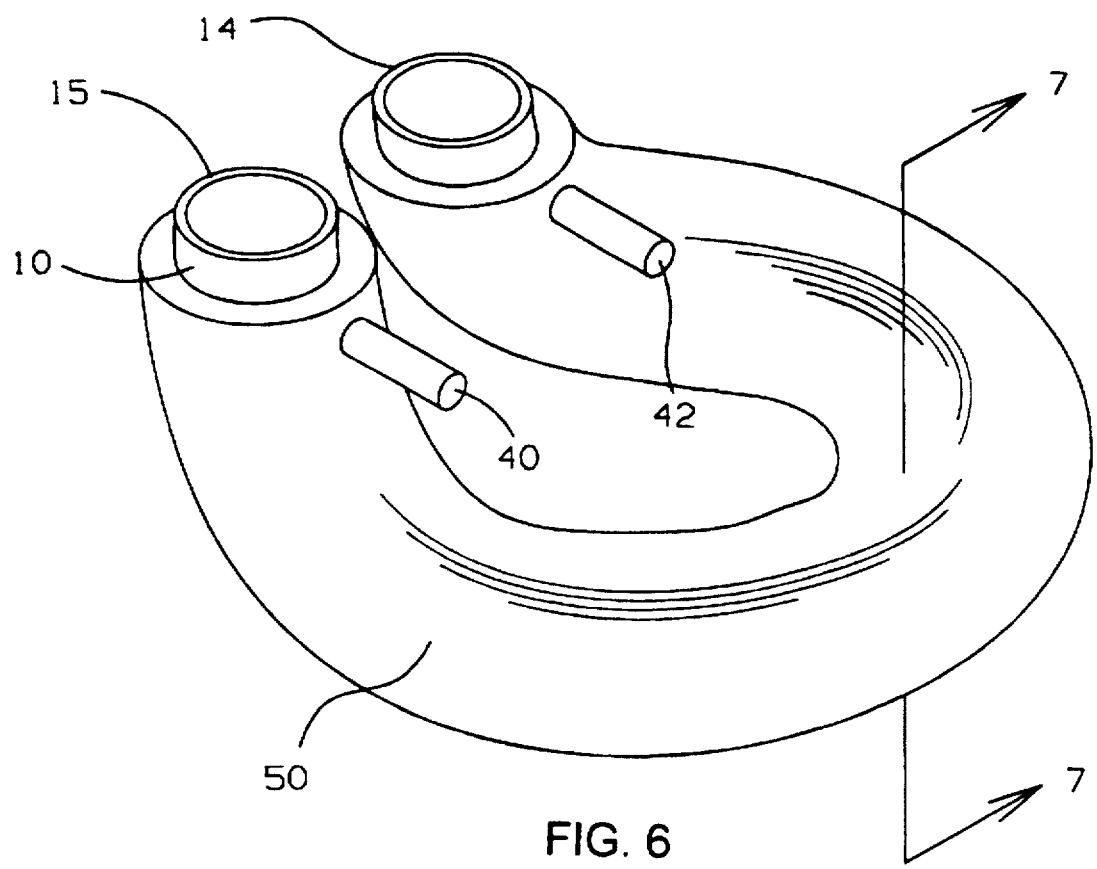
FIG. 6 is a view similar to FIGS. 2 and 4 illustrating still another embodiment of the heat recovery device of the present invention.
Figure 7:
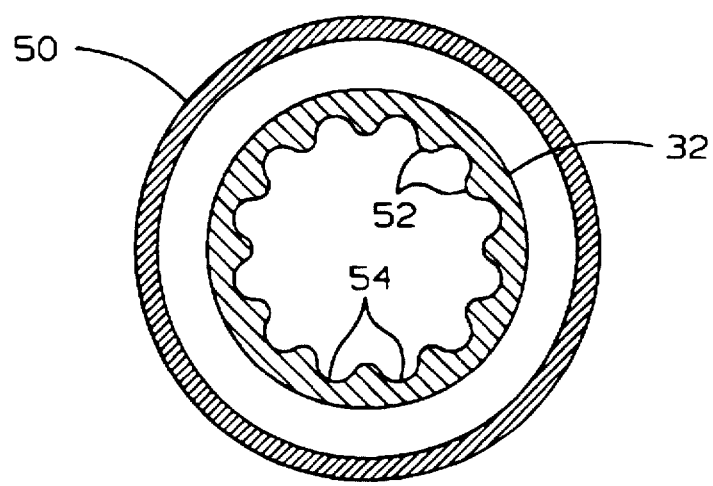
FIG. 7 is a sectional view taken on the line 7—7 of FIG. 6.

A still further embodiment of the invention is illustrated in FIGS. 6 and 7, which basically is the reverse arrangement of that shown in FIGS. 4 and 5. In this embodiment, the second conduit 50 is formed as a concentric jacket formed around the outside of the first conduit 32, with the result that the first conduit 32 is now entirely immersed in the cold water flowing through the second conduit 50. Although this arrangement does not protect the second conduit from external damage, it has the advantage that the second conduit 50 need not be formed of a material having a high degree of heat conductivity. In fact, it would be preferably to use a material that is thermally insulating in order to retain as much of the heat transferred from the first conduit 32 as possible while the cold water is passing through the second conduit, thereby permitting the second conduit 50 to be formed of less expensive but long lasting materials.

It should be noted that with the embodiments of the invention in which the second conduit containing the cold water surrounds the first conduit containing the waste water, as in the embodiment shown in FIGS. 2/3 and 6/7, it is preferable to form the inner surface of the first conduit 38 with a series of consecutive ridges and depressions 52 and 54 respectively which are arranged around the inner surface of the first conduit 38 and extend axially along the inner surface, thereby substantially increasing the heat exchange area of the inner surface relative to a flat surface.

It is to be understood that the present invention is not to be considered as limited to the specific embodiments described above and shown in the accompanying drawings, which are merely illustrative of the best modes presently contemplated for carrying out the invention and which are susceptible to such changes as may be obvious to one skilled in the art, but rather that the invention is intended to cover all such variations, modifications and equivalents thereof as may be deemed to be within the scope of the claims appended hereto.

I claim:

1. A heat recovery device adapted for use in the drain conduit of standard shower equipment installations having a hot water line, a cold water line, means for mixing water from both lines to deliver water at a suitable temperature to a shower head, and a drain conduit for disposing of waste water passing through the shower installation, the heat recovery device transferring heat from the waste water to cold water flowing to the cold water line, said heat recovery device comprising:

A. a section of generally tubular first conduit formed of a material having a relatively high degree of heat conductivity, said first conduit having an inlet end connected to an upstream portion of said drain conduit and an outlet end connected to a downstream portion of said drain conduit so that waste water passing through said drain conduit also passes through said first conduit, said inlet and outlet ends of said first conduit being connected to said upstream and downstream portions respectively of said drain conduit in such a manner that said first conduit between said inlet and outlet ends is disposed at a lower level than said inlet and outlet ends so that said first conduit remains filled with water at all times and functions as a water trap, and B. conduit means connected into said cold water line of said shower equipment and being thermally operatively associated with said first conduit such that cold water passes through said conduit means while passing through said cold water line, said conduit means causing said cold water passing through said cold water line to be exposed to heat in said first conduit from waste water passing therethrough, said conduit means comprising a second conduit formed of a material having a relatively high degree of heat conductivity, said second conduit being disposed in intimate heat exchange relationship with said first conduit, said second conduit having an inlet end connected to an upstream portion of said cold water line and an outlet end connected to a downstream portion of said cold water line so that cold water passing through said cold water line also passes through said second conduit and receives heat transferred to said first conduit by said waste water, said second conduit having a generally triangular configuration having a cross section substantially smaller than the diameter of said first conduit and is coiled around the outer surface of said first conduit in a spiral manner with one side of said triangular configuration having a curvature which corresponds to a peripheral arc of the outer surface of said first conduit whereby said second conduit is in intimate heat exchange relationship with said first conduit, whereby heat from said waste water is conducted through said first conduit to pre-heat cold water passing through said conduit means before reaching said cold water inlet.

2. A heat recovery device adapted for use in the drain conduit of standard shower equipment installations having a hot water line, a cold water line, means for mixing water from both lines to deliver water at a suitable temperature to a shower head, and a drain conduit for disposing of waste water passing through the shower installation, the heat recovery device transferring heat from the waste water to cold water flowing to the cold water line, said heat recovery device comprising:

A. a section of generally tubular first conduit formed of a material having a relatively high degree of heat conductivity, said first conduit having an inlet end connected to an upstream portion of said drain conduit and an outlet end connected to a downstream portion of said drain conduit so that waste water passing through said drain conduit also passes through said first conduit, said inlet and outlet ends of said first conduit being connected to said upstream and downstream portions respectively of said drain conduit in such a manner that said first conduit between said inlet and outlet ends is disposed at a lower level than said inlet and outlet ends so that said first conduit remains filled with water at all times and functions as a water trap, a major portion of said first conduit between said inlet and outlet ends being disposed generally in a first plane which is disposed at an angle to a substantially vertical second plane extending through said upstream and downstream portions of said drain conduit, and B. conduit means connected into said cold water line of said shower equipment and being thermally operatively associated with said first conduit such that cold water passes through said conduit means while passing through said cold water line, said conduit means causing said cold water passing through said cold water line to be exposed to heat in said first conduit from waste water passing therethrough, whereby said major portion of said first conduit occupies less vertical space between said inlet and outlet ends thereof than if said major portion of said first conduit were disposed in the vertical plane passing through said upstream and downstream portions of said drain conduit, and C. said conduit means being coiled around the outer surface of said first conduit in a spiral manner in uninterrupted successive coils extending substantially from said inlet end to said outlet end thereof with said conduit means being in continuous and uninterrupted intimate heat exchange relationship with said first conduit substantially from one end thereof to the other, whereby the greatest possible number of coils of said second conduit can be disposed around said first conduit to maximize the amount of heat transfer between said first conduit and said second conduit between said inlet and outlet ends of said first conduit.

3. A heat recovery device adapted for use in the drain conduit of standard shower equipment installations having a hot water line, a cold water line, means for mixing water from both lines to deliver water at a suitable temperature to a shower head, and a drain conduit for disposing of waste water passing through the shower installation, the heat recovery device transferring heat from the waste water to cold water flowing to the cold water line, said heat recovery device comprising:

A. a section of generally tubular first conduit formed of a material having a relatively high degree of heat conductivity, said first conduit having an inlet end connected to an upstream portion of said drain conduit and an outlet end connected to a downstream portion of said drain conduit so that waste water passing through said drain conduit also passes through said first conduit, said inlet and outlet ends of said first conduit being connected to said upstream and downstream portions respectively of said drain conduit in a manner such that the major portion of said first conduit between said inlet and outlet ends thereof is disposed at a lower level than said upstream and downstream portions of said drain conduit so that said first conduit remains filled with water at all times and functions as a water trap, said major portion of said first conduit extending laterally from said upstream and downstream portions of said drain conduit so as to lie in an approximately horizontal plane, and B. conduit means connected into said cold water line of said shower equipment and being thermally operatively associated with said first conduit such that cold water passes through said conduit means while passing through said cold water line, said conduit means causing said cold water passing through said cold water line to be exposed to heat in said first conduit from waste water passing therethrough, whereby said remaining portion of said first conduit occupies less vertical space between said inlet and outlet ends thereof than if said remaining portion of said first conduit were disposed in the vertical plane passing through said upstream and downstream portions of said drain conduit.

4. A heat recovery device as set forth in claim 3 wherein said major port of said first conduit lined in a horizontal plane, whereby said major portion of said first conduit occupies the least possible vertical space between said inlet and outlet ends thereof.

\* \* \* \* \*